US006965578B1

(12) United States Patent
Kappes

(10) Patent No.: US 6,965,578 B1
(45) Date of Patent: Nov. 15, 2005

(54) ECHO CANCELING METHOD AND APPARATUS FOR DIGITAL DATA COMMUNICATION SYSTEM

(75) Inventor: Michael S. Kappes, San Diego, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/164,504

(22) Filed: Sep. 30, 1998

(51) Int. Cl.[7] .................................................. H04B 3/20
(52) U.S. Cl. .................................. 370/286; 379/406.01
(58) Field of Search ................................ 370/286, 288, 370/289, 290, 467, 267, 268, 269, 291; 379/406.01, 379/406.05, 406.06, 406.07, 406.15, 93.28, 379/93.31, 345, 402, 406.08

(56) References Cited

U.S. PATENT DOCUMENTS

| | | | | |
|---|---|---|---|---|
| 4,539,674 | A * | 9/1985 | Carlqvist et al. | 370/32 |
| 4,629,829 | A * | 12/1986 | Puhl et al. | 455/570 |
| 4,669,116 | A * | 5/1987 | Agazzi et al. | 379/411 |
| 4,937,813 | A | 6/1990 | Schenk | |
| 5,136,576 | A * | 8/1992 | Brownlie | 370/31 |
| 5,148,427 | A | 9/1992 | Buttle et al. | |
| 5,396,517 | A * | 3/1995 | Yedid et al. | 375/233 |
| 5,500,892 | A * | 3/1996 | Essig | 379/345 |
| 5,627,885 | A * | 5/1997 | Paneth et al. | 379/93 |
| 5,812,537 | A * | 9/1998 | Betts et al. | 370/286 |
| 6,259,680 | B1 * | 7/2001 | Blackwell et al. | 370/286 |

FOREIGN PATENT DOCUMENTS

| | | |
|---|---|---|
| EP | 0 464 500 A2 | 6/1991 |
| EP | 0 464 500 A3 | 6/1991 |

OTHER PUBLICATIONS

*Line Driver Design for Broadband Communications Applications,* Electronic Design, Sep. 2, 1998, pp. 46-64.
*Digital Signal Processing in Telecommunications,* Cole, et al., Chapman and Hall, 1993, Ch. 6, pp. 161-177, Ch. 7, 191-195.
*Simulation Techniques and Standards Development for Digital Subscriber Line Systems,* Macmillan Technical Publishing, 1998, pp. 215-231, 296-297.
IPER, Dec. 27, 2000, EPO.
Internat'l Search Rept, Jan. 27, 2000 EPO.
Written Opinion, Jul. 3, 2000, EPO.

* cited by examiner

*Primary Examiner*—Man U. Phan
*Assistant Examiner*—Toan Nguyen
(74) *Attorney, Agent, or Firm*—Seed IP Law Group PLLC

(57) ABSTRACT

An improved echo cancellation technique may be employed by a server modem in a digital communication system. The disclosed echo cancellation technique provides not only for the cancellation of echo signals imparted on the received signals of a modem but also for the cancellation of various non-linearities that are present in a transmit circuitry. The echo canceler resident in the server modem may be initially trained to account for the echo signals imparted by an echo channel present in the communication system. In the preferred embodiment, the echo canceler samples an analog output signal of the transmit circuitry and produces an output signal representative of the echo signals and the non-linearities. In the context of the echo cancellation, a compensated digital signal is produced by subtracting the output signal of the echo canceler from an impaired digital signal to be received by the server modem, wherein the echo signals and non-linearities are substantially eliminated from the impaired digital signal.

16 Claims, 4 Drawing Sheets

ECHO CANCELING METHOD AND APPARATUS FOR DIGITAL DATA COMMUNICATION SYSTEM

FIELD OF THE INVENTION

The present invention relates generally to echo cancellation techniques in a digital communication system. More particularly, the present invention relates to an echo canceler scheme that compensates for transmitter non-linearities.

BACKGROUND OF THE INVENTION

The use of the Internet continues to become an increasingly popular communication tool in business, social, and recreation activities and continues to affect how people exchange, gather, and disseminate information in their everyday lives. As the demand for faster and more efficient information and data transfer continues to increase, the development of modem technology continues to improve at a rapid pace. For example, digital subscriber line (DSL) modem systems are becoming increasingly popular.

FIG. 1 depicts a conceptual diagram of a typical prior art digital communication path using current DSL modem technology in which the principles of the present invention may be incorporated. Generally, a central site, such as an Internet service provider (ISP) 100, is digitally connected to a telephone network 120 through a DSL server modem 110. Although not shown in FIG. 1, modem 110 may include a transmitter section and receiver section resident therein. Network 120 is typically connected to a central office 130, which facilitates the transfer of data via transmission lines to a client modem 140, such as, for example, another DSL modem, which may be coupled to an end-user's personal computer (PC) 150. In turn, PC 150, before, during, or after receiving the data, can transmit data back to ISP 100 through central office 130, network 120 and modems 110 and 140. Typically, such full-duplex transmission can occur over lines of 14,000 to 16,000 feet, and often over 18,000 feet in length.

As a result of the ongoing transmit and receive signals within the communication path and within the modems, corruptive cross-talk or near-end echo is generally created whenever a portion of the transmitted signal leaks into the receive path. The leakage is typically called echo if it is due to a direct electrical connection through a hybrid circuit when a single channel (e.g., a twisted pair) is used for the transmitting and receiving paths, or is called near-end crosstalk (NEXT) if it is due to a capacitive/inductive connection between separate channels used in a dual simplex system. These undesirable echo signals produced from the transfer of data through the communication path are typically canceled by the transceiver electronics. Generally, echo signals can be adequately canceled by linear systems provided in the modems so that the receive signal can be adequately interpreted by a technique generally known as echo cancellation.

The essence of echo cancellation is to utilize a known transmission signal, apply adaptive algorithms to generate a signal representing the echo, and subtract the echo estimate from the total received signal to produce the desired signal, i.e., without the echo. To cancel the echo, the digital data being transmitted is sampled and passed through an adaptive digital echo canceler, which is typically an adaptive finite impulse response filter. The adaptive filter acts to impart the same transfer function on the transmit signal as that of the actual line load seen at the input to the receiver. Typically, this line load, for a transmission line of approximately 18,000 feet, may be 135 ohms. Thus, when the echo estimate is subtracted from the total received signal, the corruptive echo or cross-talk is typically canceled to the extent of the system's linearity and to the extent that the adaptive filter linearly matches the transmission cable characteristics.

In addition, high linearity is typically required from the receiver electronics in order to adequately quantify a signal which may be severely attenuated by the transmission cable. For example, in many cases this attenuation can amount to 40 dB of noise contribution. Therefore, because the transmit signal may be coupled into the receive signal, high linearity is also required from the transmit circuitry due to the inability of a typical linear receiver to optimally recover a signal which has been contaminated by non-linearities. Non-linearities in a communication system appear to the receiver as a noise contributor and can cause deterioration of the transmit signal, i.e., the non-linearities lower the signal-to-noise ratio (SNR) and may reduce the data rate. Thus, in order to make this technique as effective as possible, the transmit circuitry should be designed with linearity which meets or exceeds the SNR of the received signal as well as the attenuation of the transmission lines. In most high data rate applications, this linearity requirement for the transmit circuitry could exceed 70 dB or 80 dB.

FIG. 2 illustrates a portion of a server modem 200, such as a DSL modem, which includes a transmit circuitry 204 and a receiver 206. In this example, a digital signal processor (DSP) 202 provides a digital signal to transmit circuitry 204 for transmission to a user modem 220. As with many practical data communication systems, near-end echo (represented by an echo path 208) associated with a transmit signal may be present in a signal received by server modem 200. The characteristics of the near-end echo signal may be dictated by functional components in the upstream and downstream channels and/or processing performed within the telephone network, including components of transmit circuitry 204. The echo signal combines with the intended receive signal and the "corrupted" receive signal is then processed by server modem 200. An echo canceler 210 is employed by server modem 200 to compensate for the near end echo. As discussed above, in an ideal modem system, a duplicate echo signal generated by echo canceler 210 is subtracted from the signal to be received by server modem 200 to produce the desired receive signal at receiver 206. However, the sampling of the transmitted signal typically occurs before the transmit circuitry, i.e., the output signal of DSP 202 is fed into echo canceler 210. As a result, any distortions, i.e., non-linearities, introduced by the transmit circuitry will not be canceled. Thus, the linearity of the transmit circuitry must typically be on the order of linearity of the rest of the communication system components, particularly user modem receiver 220, so that the transmit circuitry's distortion does not limit the transceiver's performance. Attempts to eliminate the non-linearities by designing non-linear echo canceling filters have proven unsuccessful because it is extremely difficult to model the non-linearity present in the transmit circuitry. As such, designers have been forced to utilize costly high linearity components and accept some level of non-linearities unless the non-linearities can be designed out of the transmit circuitry.

However, it is quite difficult if not impossible to design transmit circuitry that eliminates such non-linearities. With momentary reference to FIG. 4, the transmit circuitry components typically comprise a digital-to-analog converter (DAC) 402 and a line driver or amplifier 406. Due to the power requirements typically needed by amplifier 404 to drive transmit signals through the transmission cable, which generally possesses a low impedance as reflected back to amplifier 406, large amounts of current are generally produced. The large current requirement, in turn, provides design limitations in providing a highly linear line driver or amplifier. Thus, the high linearity desired in the transmit circuitry can be compromised by the need to provide the necessary power requirements, i.e., the communication system is dominated by the line driver performance. In addition, current CMOS technology typically has great difficulty in providing line drivers to the degree of linearity required for DSL applications, particularly for newly developed HDSL2 applications.

Other known methods for attempting to reduce effects of the non-linearities introduced by the transmit circuitry include the use of an analog hybrid circuit 608 at the line driver output to compensate for the non-linearities (see FIG. 6). Generally, these hybrids provide a terminating resistor configuration, $R_{T(H)}$, and an impedance configuration, $Z_{L(H)}$, that are designed in an attempt to approximate a terminating resistor, $R_T$ 602, and a transmission line impedance, $Z_L$ 604. Although these compensating analog hybrid circuits may reduce some of the effects of the non-linearities, the analog hybrids are not readily adaptive, are not integrated into the communication device and, due to the number of additional components that are required, e.g., resistors and capacitors, can often introduce complexities in design that make the circuits undesirable from a cost, marketing, and implementation viewpoint.

Thus, a new method and apparatus for an echo cancellation scheme that compensates for the non-linearities present in transmit circuity as used in a digital communication system and overcomes the prior art is greatly needed.

SUMMARY OF THE INVENTION

Accordingly, it is an advantage of the present invention that an improved echo cancellation technique suitable for modems is provided.

Another advantage of the present invention is that it provides an echo cancellation technique that provides not only for the cancellation of echo signals imparted on the received signals of a modem but also for the cancellation of various non-linearities that are present in the transmit circuitry.

Another advantage is that the present invention does not require system designers to configure and select transmit circuitry whose performance is predicated on the linearity requirements of other system components.

Another advantage of the present invention is that the power requirements for the transmit circuitry of a the modem are significantly reduced while the performance of the modem is increased.

The above and other advantages of the present invention may be carried out in one form by a method for compensating for echo signals and non-linearities present in a digital communication system comprising the steps of sampling the analog output signal of a transmitter and performing echo cancellation on an impaired digital signal to cancel the echo signals and non-linearities present in the impaired digital signal to produce a compensated digital signal.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EXEMPLARY EMBODIMENTS

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, control signaling, signal processing and conditioning, and the like. Such general techniques are known to those skilled in the art and will not be described in detail herein.

Figure 1:
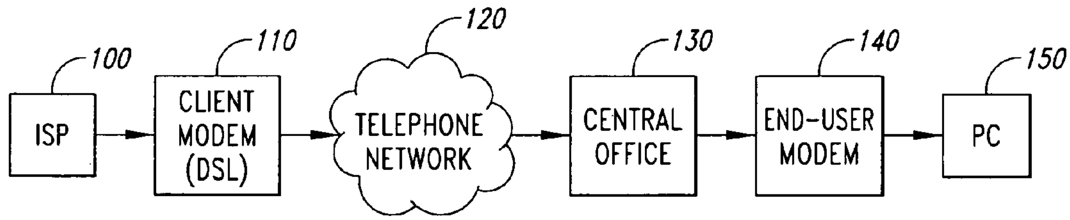
FIG. 1 is a schematic representation of an exemplary modem system in which the principles of the present invention may be incorporated.
Figure 2:
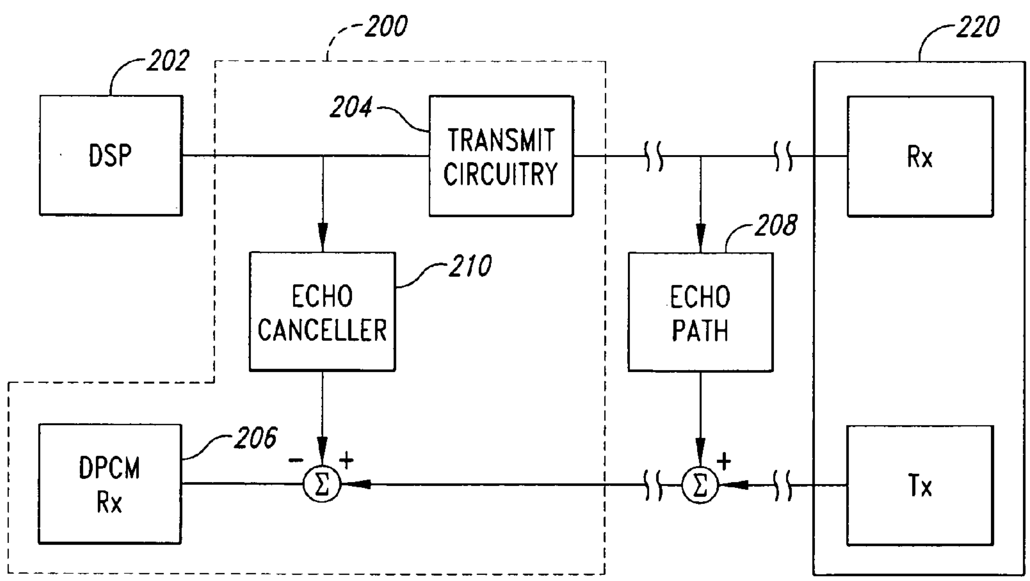
FIG. 2 is a schematic representation of a prior art modem system having an echo canceler that merely compensates for near-end echo signals.
Figure 3:
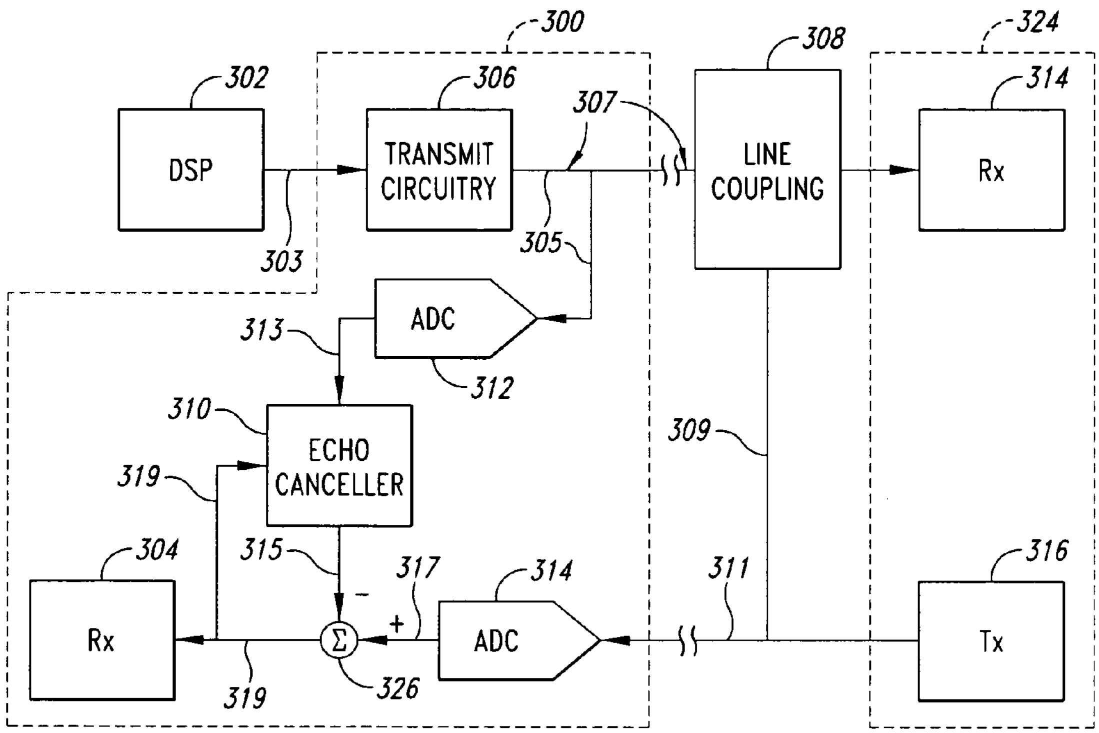
FIG. 3 is a detailed schematic representation of an exemplary modem system having an echo canceler configured in accordance with the present invention.

An exemplary digital communication system that may incorporate the principles of the present invention is generally shown in FIG. 1, and FIG. 3 is a more detailed block diagram depiction of an exemplary communication device 300, preferably comprising a modem, configured in accordance with the present invention. It should be appreciated that the particular implementation shown in FIG. 3 and described herein is merely exemplary and is not intended to limit the scope of the present invention in any way. Indeed, for the sake of brevity, conventional timing recovery, automatic gain control (AGC), synchronization, training, and other functional aspects of modem 300 are not described in detail herein. In addition, various physical products and components not shown or described in detail, such as, for example, framers, microcontrollers, and transformers of modem 300, may be incorporated in accordance with an exemplary embodiment. Furthermore, the connecting lines shown in FIG. 3 and elsewhere in the figures are intended to represent exemplary functional relationships and/or physical couplings between the various elements. Those skilled in the art will recognize that many alternative or additional functional relationships or physical connections may be present in a practical modem system.

FIG. 3 illustrates a portion of a server modem 300, which includes a transmit circuitry 306, a receiver 304, and an echo canceler 310. In accordance with a preferred embodiment, server modem 300 is comprised of a DSL modem. Transmit circuitry 306 is suitably configured to provide a transmit signal representative of digital data to be transmitted. Preferably, the digital data is generated by a DSP 302. However, in accordance with the present invention, the digital data may be generated by various other suitable devices configured for generating digital signals, now known or hereafter devised. Accordingly, DSP 302 cooperates with transmit circuitry 306 to facilitate the transmission of digital data to a receiver 314 in a client communication device 324, e.g., a DSL modem.

In accordance with a preferred embodiment, transmit circuitry 306 is configured to provide a four level signal, e.g., a Two Binary One Quaternary line code (2B1Q) as utilized with High Bit-rate Digital Subscriber Line (HDSL) systems. Alternatively, transmit circuitry 306 is configured to provide any level code or any type of line code without departing from the scope of the present invention. For example, transmit circuitry 306 may also be configured to provide discrete multitone (DMT), Optis (as used with HDSL2), Carrier Amplitude Phase (CAP as used with ASDL), or G.lite transmission in accordance with various exemplary embodiments of the present invention.

In accordance with an exemplary embodiment, transmit circuitry 306 is suitably configured to receive the digital data from DSP 302 and to transmit a signal representative of the digital data to client modem 324. Accordingly, transmit circuitry 306 includes various components to drive the transmit signal downstream through the communication path and to modem 324. In accordance with this aspect, transmit circuitry 306 comprises a line driver 406 (see FIG. 4) to facilitate the transmission of the signal. This line driver 406 preferably comprises a buffer amplifier configured to provide a high-output current while maintaining a low signal distortion.

Figure 4:
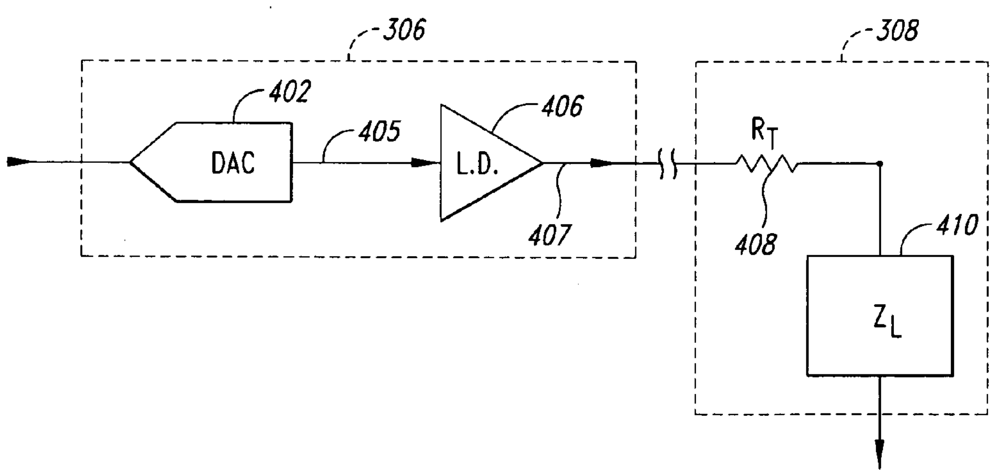
FIG. 4 is a detailed schematic representation of exemplary transmit circuitry and line coupling as configured in accordance with the present invention.

In accordance with a preferred aspect, with reference to FIG. 4, transmit circuitry 306 includes a digital-to-analog converter (DAC) 402 and line driver 406. DAC 402 is configured to receive the digital data from DSP 302 and to convert the digital data into representative analog signals, such as, for example, 2B1Q four level signals, Optis, DMT or the like, as an analog output 405. Preferably, DAC 402 may be configured to provide 14-bit resolution (for an 80 dB system), however, DAC 402 may also be configured in any desired bit resolution without departing from the scope of the present invention.

In accordance with a preferred embodiment, DAC 402 includes a reconstruction filter (not shown) to adjust analog output 405 of DAC 402. In accordance with this aspect, filter is comprised of a low-pass filter to reconfigure analog output 405 into a more desirable sinusoidal output, i.e., by a pulse-shaping technique, before applying it to line driver 406. Moreover, in accordance with this aspect, the filter may be configured in the digital domain or analog domain, i.e., operatively coupled before or after DAC 402, to facilitate the processing of analog output 405 into a more desirable frequency shape.

After the digital data is converted, and preferably filtered, line driver 406 receives analog output 405 and provides an analog output signal 407 with a defined bandwidth to be sent to client modem 324. In accordance with a preferred aspect, analog output signal 407 may be comprised of a voltage or a current, depending upon the desired implementation. In accordance with a preferred embodiment, line driver 406 is suitably configured so as to provide transmit circuitry 306 with desired linearity while maintaining an allowable amount of non-linearities.

In accordance with an exemplary embodiment, line driver 406 communicates with client modem 324 to facilitate the transfer of analog output signal 407 to modem 324. In accordance with a preferred aspect, a communication channel is established between modem 300 and modem 324. Accordingly, line driver 406 is operatively coupled to client user modem 324 through a transmission line 307 and line coupling 308. Transmission line 307 is suitably configured to permit the transfer of analog data at desired rates. Accordingly, transmission line 307 may be comprised of various known transmission cables, such as, for example, twisted pair, coaxial, two-twisted-pairs or other suitable cabling. Moreover, transmission line 307 may be configured for single channel or separate channels, such as used in a full duplex mode, or other suitable configurations. Accordingly, analog output signal 407 is received by modem 324 after passing through transmission line 307 and line coupling 308. In a practical application, analog output signal 407 may also be transmitted through a number of network switches and be subject to conventional processing associated with the telephone network.

In accordance with a preferred embodiment, line coupling 308 may be associated with an echo path, i.e., an analog path, which conveys the echo signal at an analog hybrid at modem 324 and at transmission line 307. Accordingly, line coupling 308 includes a path operatively coupled to a transformer and a terminating resistor. With momentary reference to FIG. 4, in accordance with this aspect, line coupling 308 is suitably configured such that an input impedance, $Z_L$ 410, is properly balanced with the effective impedance of transmission line 307, including terminating resistor 408, to facilitate maximum power transfer of line driver 406. As a result of the configuration of line coupling 308, an echo channel 309 may be developed; echo canceler 310 may convey echo signals between transmit circuitry 306 and receiver 304. Accordingly, these echo signals, which may be comprised of direct echo or NEXT, may be present in a transmitted signal received by server modem 300.

Echo canceler 310 may be realized by any number of conventional structures. In one exemplary embodiment, echo canceler 310 is suitably configured as an adaptive digital filter that may be characterized by an impulse response of finite duration, i.e., a finite-duration impulse filter (FIR) whose structures contain feedforward paths only. In accordance with another embodiment, echo canceler 310 may be comprised of an infinite-duration impulse filter (IIR) whose structures also contain feedbacks paths. Other exemplary adaptive filters which may be utilized in accordance with various embodiments of the present invention are described in detail in ADAPTIVE FILTER THEORY, by Simon Haykin (3rd ed., 1996), which is incorporated by reference herein.

In accordance with an exemplary embodiment of the present invention, echo canceler 310 is suitably connected to transmission line 307 (either directly or in series with other components) to facilitate the sampling of analog output signal 407. Alternatively, echo canceler 310 may sample analog output signal 407 directly, e.g., a direct feed from transmit circuitry 306. In accordance with a preferred embodiment, server modem 300 includes an analog-todigital converter (ADC) 312 to facilitate the quantization of analog output signal 307 into a sampled digital signal 313. In accordance with a most preferred embodiment, ADC 312 may be configured to provide 14-bit linear resolution at 2 Mbps. Alternatively, ADC 312 may configured to any desirable resolution as dictated by the SNR and/or other specifications of the communication system. Accordingly, sampled digital signal 313 (or a signal associated therewith) is directed into echo canceler 310. It should be noted that additional components may be included in the received signal path for echo canceler 310, including, for example, delay elements, filters, scaling elements, and other signal conditioning elements without departing from the scope of the present invention.

In accordance with another preferred aspect of the present invention, echo canceler 310 may be trained in accordance with known techniques to model the transfer function imparted on analog output signal 407 by line coupling 308. Preferably, this echo cancellation training occurs during an initialization period near the beginning of a communication session. Typically, training of echo canceler 310 is performed while the system is in a half-duplex mode, i.e., a remote transmitter 316 in client modem 324 is disabled such that only the echo components are received by modem 300. Alternatively, training of echo canceler 310 may be performed while the system is in a full-duplex mode, i.e., remote transmitter 316 provides a known signal, such that the known signal and the echo components are received by modem 300.

With reference to FIG. 3, in accordance with a preferred embodiment of the present invention, echo canceler 310 is trained in response to an error signal 319 that is representative of the difference between the echo associated with a known training signal sent by DSP 302 and the echo estimate generated by echo canceler 310. The filter coefficients of echo canceler 310 are suitably adjusted in an attempt to drive error signal 319 to an acceptable value. After a predetermined time period, or after the filter taps converge, the training procedure may terminate. Accordingly, echo canceler 310 is suitably trained to compensate for the transfer function imparted on the received signal by line coupling 308 to effectively reduce the corresponding echo that may be present during a communication session. After initial training, the modem system may perform other training procedures or enter into the data tracking mode. The echo canceler 310 may be periodically updated during the data mode to ensure it accurately estimates the echo.

In accordance with a preferred embodiment, server modem 300 also includes an ADC 314. In accordance with this embodiment, ADC 314 is suitably configured to process the analog signal received by modem 300. In accordance with this aspect, ADC 314 is suitably configured to exceed the resolution required by the communication system, e.g., an 80 dB system would preferably utilize 14-bit linear resolution. Moreover, it is preferable for ADC 314 to at least meet or exceed the resolution of ADC 312. During the normal data mode, the signal received by modem 300 predominantly includes a signal representative of the data transmitted in an upstream communication channel by transmitter 316 in user modem 324. In addition, the received signal may also contain an echo component associated with the signal transmitted by modem 300. ADC 314 suitably converts the analog data of transmitter 316 into digital data 317 for further processing by modem 300.

Figure 5:
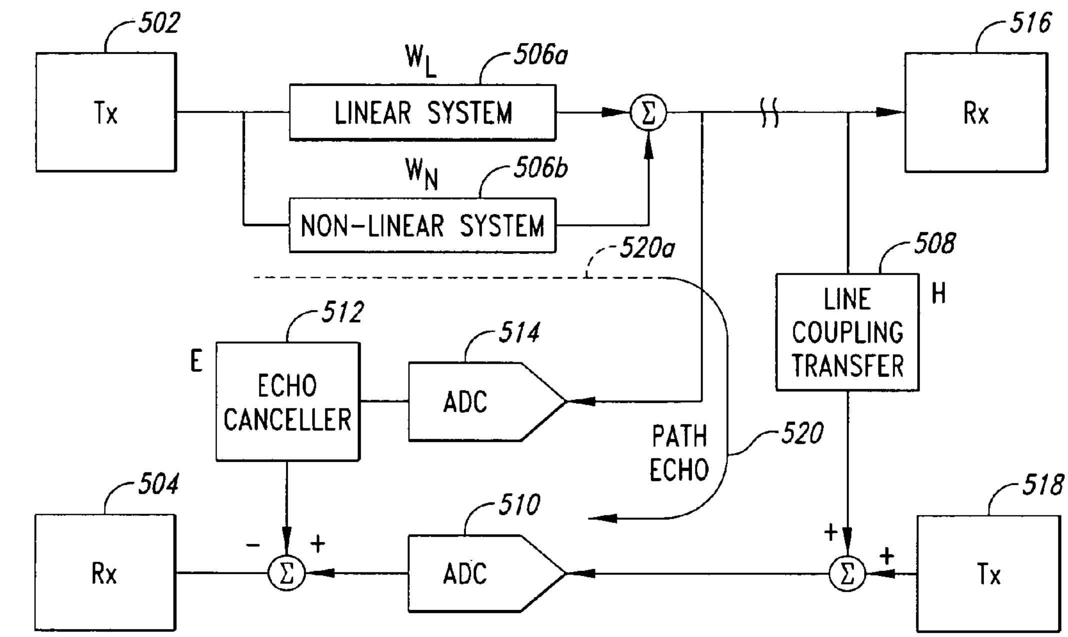
FIG. 5 is a schematic representation of the associated transfer functions imparted on transmission and receive signals in accordance with a preferred embodiment of the present invention.
Figure 6:
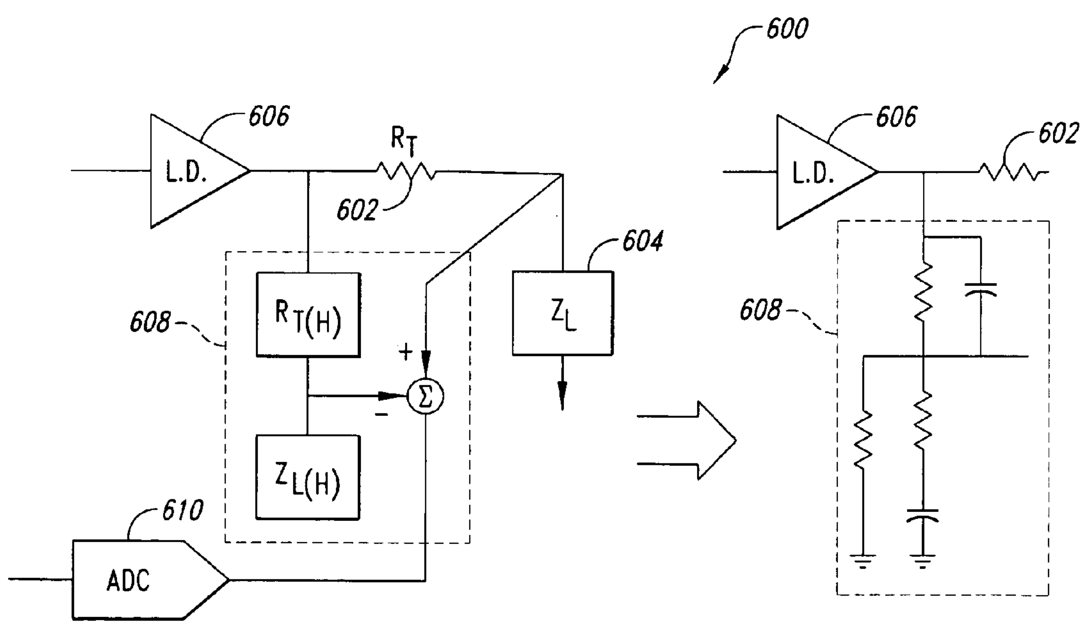
FIG. 6 is an exemplary embodiment of an analog hybrid circuit as employed in the context of the present invention.

With momentary reference now to FIG. 5, a block diagram representing the various transfer functions imparted on the communication system in the frequency domain is shown. The associated transfer function of a signal received by receiver 504 would include contributions from a signal transmitted by transmitter 502 ($T_{X1}$), a signal transmitted by transmitter 518 ($T_{X2}$), the echo signal associated with a line coupling element 508 (H), a linear element 506*a* of the transmit circuitry ($W_L$), a non-linear element 506*b* of the transmit circuitry ($W_N$), an echo canceler element 512 (E), and other elements (not shown) present in modem system 300. In the frequency domain, the transmit signals are typically multiplied by the transfer function elements to determine the resulting transfer function equation. For the example shown in FIG. 5, the echo cancellation model for determining the transfer function imparted on receiver 504 would be determined as follows:

$$R_X=(T_{X1}\cdot W_L\cdot H)+(T_{X1}\cdot W_N\cdot H)+T_{X2}-(E\cdot T_{X1})$$

Thus for receiver 504 to receive a fully echo compensated transmit signal from transmitter 518, i.e., $R_X=T_{X2}$, then echo canceler 512 would need to be configured as follows:

$$E=(H\cdot W_L)+(H\cdot W_N)$$

Due to the existence of linear system element 506*a* and non-linear system element 506*b* within transmit circuitry 306, echo canceler 512 can not completely compensate for the effects of non-linearities, i.e., linear echo cancelers can only be adapted to linear system element 506*a* and, thus, the non-linearities present in non-linear system element 506*b* can not be eliminated by the prior art techniques. However, with reference to FIG. 5, in accordance with an exemplary embodiment of the present invention, the echo cancellation model would be determined as follows:

$$Rx=(T_{X1}\cdot W_L+T_{X1}\cdot W_N)\cdot H+T_{X2}-(T_{X1}\cdot W_L+T_{X1}\cdot W_N)\cdot E;$$
$$R_X=T_{X1}\cdot(W_L+W_N)\cdot H+T_{X2}-T_{X1}\cdot(W_L+W_N)\cdot E$$

Thus, for receiver 504 to receive a fully echo compensated transmit signal from transmitter 518, i.e., $R_X=T_{X2}$, then echo canceller 512 would need to be configured as follows:

$$E=H$$

Therefore, in accordance with the exemplary embodiment, as echo canceler 512 is suitably configured to reflect the transfer function of line coupling 308, the non-linearities 506*b* can be effectively canceled.

In accordance with an exemplary embodiment, the operation of a preferred echo cancellation technique will now be described. With reference to FIGS. 3 and 4, digital data is transmitted by DSP 302 into transmit circuitry 306. Preferably, transmit circuitry 306 converts the digital data into a representative analog signal with DAC 402, filters the analog signal with filter 404 and then outputs an analog signal 307, such as, for example, 2B1Q four-level data, with line driver 406. Accordingly, analog output signal 307 is transmitted over the communication channel and eventually received by receiver 314 in user modem 324.

In addition to the downstream transmission, transmitter 316 may provide a transmit signal for receipt by receiver 304. Analog signal 309 is representative of the signal transmitted by modem 324 and any distortions imparted from line coupling 308, i.e., the echo produced from the transmission of the digital data from DSP 302. Preferably, ADC 314 suitably converts analog signal 311 into a digital signal 317.

In accordance with the preferred exemplary embodiment, echo canceler 310 samples analog signal 307 to suitably compensate for non-linearities present within transmit circuitry 306 as well as to cancel the echo signals present in the communication path. In accordance with a particularly preferred embodiment, echo canceler 310 is initially trained, for example, with a training procedure as described above, to obtain an initial modeling of the transfer function imparted by line coupling 308. Continuing in accordance with the preferred exemplary embodiment, ADC 312 receives analog output signal 307 and converts signal 307 into a corresponding digital signal 313. Accordingly, digital signal 313 is a quantized representation of analog signal 307. After receiving digital signal 313, echo canceler 310 adaptively filters digital signal 313 to suitably provide a digital signal 315 that estimates the echo signal 309 as imparted by line coupling 308 as well as the non-linearities imparted by transmit circuitry 306.

In accordance with an exemplary embodiment, an echo cancellation procedure occurs at summing junction 326 wherein digital signal 315, representative of the echo signal produced by the transmission signal, is subtracted from digital signal 317 to suitably cancel the corruptive echo present in digital signal 317 and produce a compensated digital signal 319. In accordance with the present invention, any non-linearities present within transmit circuitry 306 are also suitably canceled. This cancellation of the non-linearities occurs as a result of the sampling of analog output signal 305, which contains the non-linearities introduced by transmit circuitry 306, by echo canceler 310 and the corresponding filtering of the non-linearities by the linear system within echo canceler 310. As shown in FIG. 3, digital signal 319 may also be used as an update signal for echo canceler 310.

Figure 7:
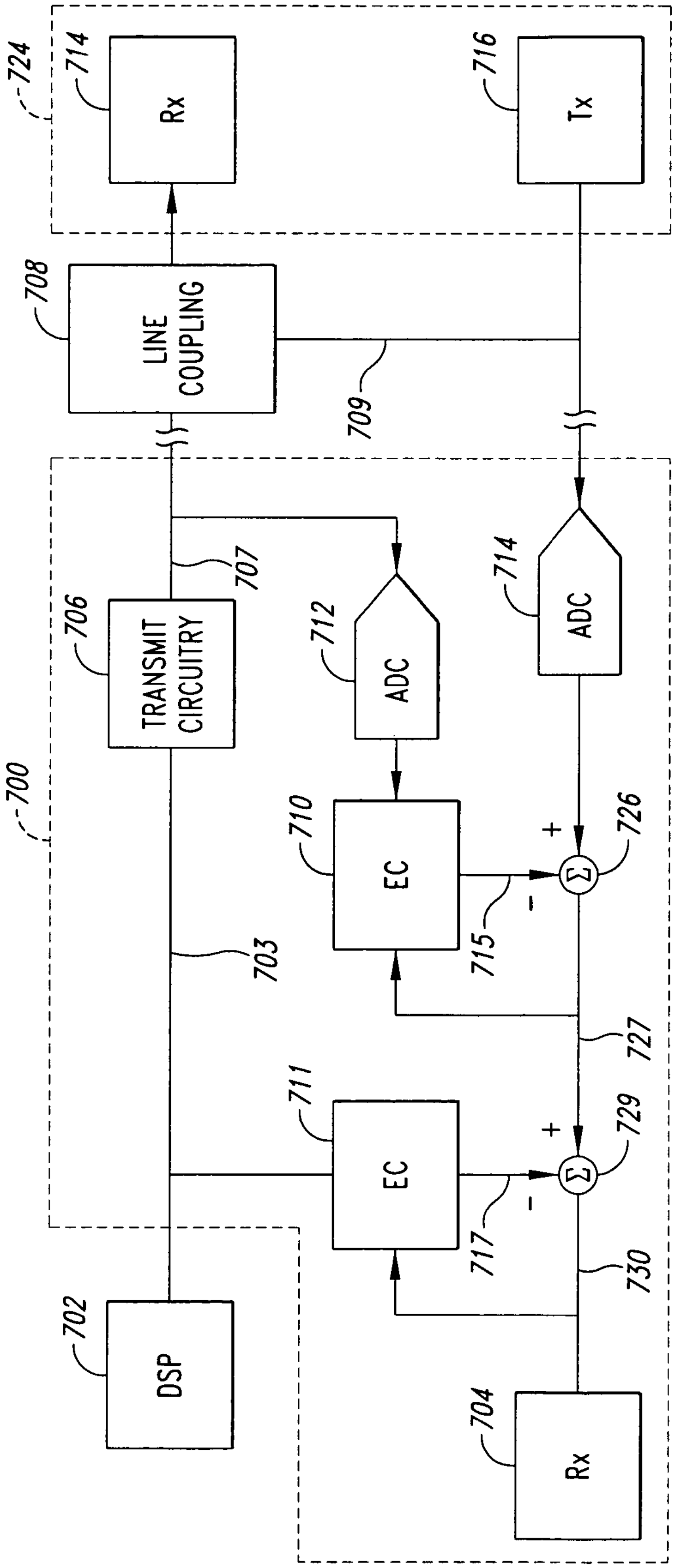
FIG. 7 is a detailed schematic representation of another exemplary modem system having dual echo cancelers configured in accordance with the present invention.

With reference now to FIG. 7, another preferred embodiment of the present invention is shown. In accordance with this embodiment, a server modem 700 suitably includes a first echo canceler 710 and a second echo canceler 711. Accordingly, echo canceler 710 preferably serves as a "coarse" compensating device and may be configured in a similar manner to the various configurations of echo canceler 310 described above, e.g., sampling analog output signal 707 to eliminate non-linearities of transmit circuitry 706. Echo canceler 711 is configured as a "fine"compensating device to compensate for echo signals produced between a digital output 703 of a DSP 702 and an analog output 707 of a transmit circuitry 706, i.e., the hybrid within the transmission line of server modem 700. Thus, as a result of the combination of "coarse" and "fine" echo cancelers 710 and 711, additional improvements in the signal transmitted from a transmitter 716 may be realized, i.e., further reduction in the echo. Moreover, echo cancelers 710 and 711 may be suitably trained as described above. In accordance with this aspect, coarse echo in canceler 711 may be trained first, followed by fine echo canceler 710. Alternatively, the order of training may be reversed.

The compensation for the non-linearities in transmit circuitry 306 permits system designers and integrators to have greater flexibility in the selection of transmit circuitry 306 components, such as the line driver or amplifier. For example, in a given communication system, receiver 304 may be designed for high linearity, e.g., 80 dB. Under prior art systems, transmit circuitry also had to be designed to perform with a high linearity of at least 80 dB due to its effect on the transmission signal. In accordance with a preferred embodiment of the present invention, the required linearity of transmit circuitry 306 for a given application may be reduced to a lower requirement, such as, for example, 60 dB. Accordingly, the additional 20 dB is matched in echo canceler 310, i.e., the 20 dB of non-linearity within transmit circuitry 306 is suitably canceled by echo canceler 310. As a result, system designers can incorporate more cost effective transmit circuitry components and yet obtain a more preferable receive signal at receiver 304.

In addition, since high linearity line drivers require higher amounts of power, a reduction in linearity results in a reduction in total power required. Although the additional ADC requires some additional power (typically 100–150 mW) this additional amount is insignificant when compared with the power reduced in the line driver. As a result, a lower power, higher performance communication system is produced.

In summary, the present invention provides an improved echo cancellation technique suitable for modems; the technique is more cost effective and reliable than prior art methods. The preferred echo canceler provides not only for the cancellation of echo signals imparted on the received signals but also for the cancellation of the non-linearities that are present in the transmit circuitry. Unlike prior art methodologies, the preferred echo canceler process does not require designers to configure and select transmit circuitry whose performance is predicated on the linearity required of the receiver components, i.e., require the same high-linearity as the receiver. Furthermore, to the extent that non-linearities exist in the transmit circuitry, the echo canceler scheme cancels the non-linearities as opposed to operating with an unacceptable amount of non-linearities as contemplated by the previous solutions.

The present invention has been described above with reference to a preferred embodiment. However, those skilled in the art will recognize that changes and modifications may be made to the preferred embodiment without departing from the scope of the present invention. For example, in accordance with additional preferred embodiments, an analog hybrid may also be incorporated into the preferred embodiments without departing from the scope of the present invention. In addition, other processing components may be introduced and the number of processing components within the above communication schemes may be altered in accordance with additional preferred embodiments of the present invention. These and other changes or modifications are intended to be included within the scope of the present invention, as expressed in the following claims.

What is claimed is:

1. An echo cancellation method for a digital data communication system comprising a first device having a first transmitter and a first receiver, and a second device having a second transmitter and a second receiver, wherein said first transmitter is configured to transmit signals to said second receiver over a downstream communication channel, said first receiver is configured to receive signals from said second transmitter over an upstream communication channel, and an echo channel conveys echo signals between said first transmitter and said first receiver, said method comprising:

generating an analog output signal by said first transmitter for receipt by said second receiver, the analog output signal including characteristics associated with a non-linearity introduced by said first transmitter;

sampling said analog output signal;

performing echo cancellation based on said analog output signal that includes the characteristics associated with the nonlinearity, using an echo canceler having a transfer function that is based upon a transfer function of a line coupling between the first transmitter and the second receiver, wherein said echo cancellation cancels an echo signal conveyed by said echo channel;

sampling a digital signal provided by a digital signal processor, said digital signal being operatively coupled to an input of said first transmitter; and performing a second echo cancellation based on said digital signal, wherein said second echo cancellation further cancels the echo signals conveyed by said echo channel.

2. A method according to claim 1, wherein said performing echo cancellation substantially reduces the effect, on signals received by said first receiver, of non-linearities present in said first transmitter.

3. A method according to claim 2, wherein said performing echo cancellation further comprises:

converting said analog output signal into a corresponding digital signal, said digital signal corresponding to at least a part of the echo signals as well as the non-linearities present in said first transmitter; and subtracting the digital signal from signals received by said first receiver to produce a compensated digital signal.

4. A method according to claim 3, wherein said performing echo cancellation further comprises training an echo canceler to account for at least a part of the echo signals imparted by said echo channel on signals received by said first receiver.

5. A method according to claim 4, wherein said performing echo cancellation further comprises updating said echo canceler with an update signal to increase the accuracy of an echo estimate generated by said echo canceler.

6. A communication device to compensate for non-linearities and echo signals present in a digital communication system, said device comprising:

a transmitter to provide an analog output signal having characteristics associated with a nonlinearity introduced by the transmitter;

a receiver to receive a compensated digital signal;

an echo canceler having an input signal and an output signal, wherein said input signal is essentially the analog output signal provided by the transmitter and having the characteristics associated with the nonlinearity, and said output signal is representative of the echo signals and the non-linearities present in said digital communication system, the echo canceler having a transfer function that is based upon a transfer function of a line coupling present in the digital communication system;

means for producing said compensated digital signal in response to the output signal of said echo canceler and a signal sent by a second communication device associated with said digital communication system; and a second echo canceler having an input signal and an output signal, wherein said input signal of said second echo canceler is operatively coupled to an input of said transmitter, said output signal of said second echo canceler is representative of said echo signals, and wherein said second echo canceler is further operative to cancel the echo signals present in said digital communication system.

7. A communication device according to claim 6, wherein said device further comprises a first analog-to-digital converter to convert the analog signal of said transmitter into a digital signal associated with the input signal of said echo canceler.

8. A communication device according to claim 7, wherein said device further comprises:

a second analog-to-digital converter to convert an impaired analog signal transmitted by the second communication device into a digital signal, wherein said digital signal of said second analog-to-digital converter contains the echo signals and non-linearities present in said digital communication system and comprises the digital signal sent by the second communication device.

9. A communication device according to claim 8 wherein said echo canceler is capable of being trained to account for the echo signals present in said digital communication system.

10. A communication device according to claim 9, wherein said echo canceler is capable of being updated to increase an accuracy of an echo estimate generated by said echo canceler.

11. The communication device of claim 6 wherein the transfer function of the echo canceler equals the transfer function of the line coupling.

12. An echo cancellation method for a digital data communication system comprising a first device having a first transmitter and a first receiver, and a second device having a second transmitter and a second receiver, said first transmitter being configured to transmit signals to said second receiver over a downstream communication channel, and said first receiver being configured to receive signals from said second transmitter over an upstream communication channel, said method comprising:

generating an analog output signal by said first transmitter for receipt by said second receiver, the analog output signal including characteristics associated with a nonlinearity introduced by the first transmitter;

sampling said analog output signal;

detecting a signal on an echo channel associated with an actual echo signal at said second device;

performing echo cancellation based on said sampled analog output signal having the characteristics associated with the nonlinearity and said signal on said echo channel, by using an echo canceler having a transfer function that is based upon a transfer function of a line coupling between the first transmitter and the second receiver;

sampling a digital signal provided by a digital signal processor, said digital signal being operatively coupled to an input of said first transmitter; and performing a second echo cancellation based on said digital signal, wherein said second echo cancellation further cancels said signal on said echo channel.

13. A method for compensating for non-linearities introduced into a digital communication system, said method comprising:

sampling an analog output provided by a local transmitter, said analog output including a known training signal and characteristics associated with a nonlinearity introduced by said local transmitter;

calculating an estimated echo signal in response to said known training signal;

detecting a signal on an echo channel associated with an actual echo signal at a second device;

producing a compensated digital signal for receipt by a local receiver, wherein said nonlinearity is substantially eliminated from the compensated digital signal on the basis of the estimated echo signal and said signal associated with said actual echo signal at said second device, by using an echo canceler that receives the sampled analog output that includes the characteristics associated with the nonlinearity, the echo canceler having a transfer function that is based upon a transfer function of a line coupling present in the digital communication system;

sampling a digital signal provided by a digital signal processor, said digital signal being operatively coupled to an input of said local transmitter; and performing a second echo cancellation based on said digital signal, wherein said second echo cancellation further cancels said signal on the echo channel.

14. A first communication device for compensating for non-linearities and echo signals present in a digital communication system, said first device comprising:

a transmitter to provide an analog output signal having characteristics associated with a nonlinearity introduced by the transmitter;

a receiver to receive a compensated digital signal;

an echo canceler coupled to an output terminal of the transmitter having an input signal and an output signal, wherein said input signal is essentially the analog output signal provided by the transmitter and having the characteristics associated with the nonlinearity, and said output signal is representative of the echo signals and the non-linearities present in said digital communication system, the echo canceler having a transfer function that is based upon a transfer function of a line coupling present in the digital communication system;

an input associated, at least in part, with an actual echo signal at a second communication device;

a summing junction operably coupled with the output signal of the echo canceller and further operably coupled with the input associated, at least in part, with said actual echo signal at said second communication device; and a second echo canceler having an input signal and an output signal, wherein said input signal of said second echo canceler is operatively coupled to an input of said transmitter, said output signal of said second echo canceler is representative of said echo signals, and wherein said second echo canceler is further operative to cancel the echo signals present in said digital communication system.

15. The first device of claim 14 wherein the line coupling includes a termination resistor, an input impedance, and an effective transmission line impedance.

16. The communication device of claim 14 wherein the transfer function of the echo canceler equals the transfer function of the line coupling.

* * * * *